(12) United States Patent
Grosse Bley et al.

(10) Patent No.: US 11,009,030 B2
(45) Date of Patent: May 18, 2021

(54) MASS-SPECTROMETRIC LEAK DETECTOR WITH TURBOMOLECULAR PUMP AND BOOSTER PUMP ON A COMMON SHAFT

(71) Applicant: INFICON GmbH, Cologne (DE)

(72) Inventors: Werner Grosse Bley, Cologne (DE); Thomas Böhm, Cologne (DE); Hjalmar Bruhns, Cologne (DE)

(73) Assignee: INFICON GmbH, Cologne (DE)

( * ) Notice: Subject to any disclaimer, the term of this patent is extended or adjusted under 35 U.S.C. 154(b) by 213 days.

(21) Appl. No.: 16/308,521

(22) PCT Filed: Jun. 13, 2017

(86) PCT No.: PCT/EP2017/064434
§ 371 (c)(1),
(2) Date: Dec. 10, 2018

(87) PCT Pub. No.: WO2017/216173
PCT Pub. Date: Dec. 21, 2017

(65) Prior Publication Data
US 2019/0162193 A1    May 30, 2019

(30) Foreign Application Priority Data

Jun. 15, 2016  (DE) ...................... 10 2016 210 701.1

(51) Int. Cl.
*F04B 19/04*    (2006.01)
*G01M 3/20*    (2006.01)
(Continued)

(52) U.S. Cl.
CPC ........... *F04D 19/042* (2013.01); *F04D 19/04* (2013.01); *F04D 19/046* (2013.01); *F04D 25/16* (2013.01); *F04D 29/104* (2013.01); *G01M 3/205* (2013.01)

(58) Field of Classification Search
CPC ...... F04D 19/04; F04D 19/042; F04D 19/044; F04D 19/046; F04D 25/16; F04D 29/104; G01M 3/205
(Continued)

(56) References Cited

U.S. PATENT DOCUMENTS

| 2,872,102 | A | * | 2/1959 | Ryba | ...................... | F04B 35/045 |
| | | | | | | 417/416 |
| 3,520,173 | A | * | 7/1970 | Hadley | .............. | G01N 33/2817 |
| | | | | | | 73/35.02 |

(Continued)

FOREIGN PATENT DOCUMENTS

| DE | 2049117 A1 | 5/1971 |
| DE | 19735250 A1 | 2/1999 |

(Continued)

*Primary Examiner* — Charles G Freay
(74) *Attorney, Agent, or Firm* — The Webb Law Firm

(57) ABSTRACT

Disclosed is a mass-spectrometry leak detector including a multi-stage turbomolecular pump, a mass spectrometer connected to the suction side of the turbomolecular pump, a preliminary vacuum pump connected to the pressure side of the turbomolecular pump, and a booster pump stage. The suction side of the booster pump stage has a connection for a test object and the pressure side is connected to the pressure side of the turbomolecular pump and to the suction side of the preliminary vacuum pump by means of a gas line path. The stages of the turbomolecular pump and the booster pump stage are arranged on a common shaft and have a common drive and the gas line path is interrupted, by means of a separation, between the pressure side of the booster pump stage and the suction side of the pump stage of the turbomolecular pump connected to the mass spectrometer.

10 Claims, 2 Drawing Sheets

(51) Int. Cl.
*F04D 19/04* (2006.01)
*F04D 29/10* (2006.01)
*F04D 25/16* (2006.01)

(58) Field of Classification Search
USPC .................................................. 417/423.4
See application file for complete search history.

(56) References Cited

U.S. PATENT DOCUMENTS

| | | | | |
|---|---|---|---|---|
| 3,536,418 | A | * 10/1970 | Breaux | F04D 19/046 417/49 |
| 3,616,680 | A | 11/1971 | Schrader | |
| 4,180,370 | A | * 12/1979 | Klatt | F04D 19/042 415/111 |
| 4,527,805 | A | * 7/1985 | Gowda | F16J 15/43 277/410 |
| 4,779,449 | A | * 10/1988 | Bley | G01M 3/202 73/40.7 |
| 4,919,599 | A | 4/1990 | Reich et al. | |
| 5,821,404 | A | * 10/1998 | Bohm | G01M 3/202 73/40.7 |
| 6,415,650 | B1 | 7/2002 | Böhm et al. | |
| 6,705,844 | B2 | * 3/2004 | Englander | F04D 19/042 277/400 |
| 7,082,404 | B2 | * 7/2006 | Calderaro | G06Q 10/10 705/7.42 |
| 2004/0013514 | A1 | 1/2004 | Englander | |
| 2006/0280615 | A1 | 12/2006 | Bohm et al. | |
| 2016/0116365 | A1 | 4/2016 | Luedolph et al. | |

FOREIGN PATENT DOCUMENTS

| | | | | |
|---|---|---|---|---|
| DE | 10004271 | A1 | 8/2001 | |
| EP | 0344345 | A1 | 12/1989 | |
| EP | 1503199 | A2 | 2/2005 | |
| GB | 1330685 | A | 9/1973 | |
| WO | WO-9517655 | A1 | * 6/1995 | ............ G01M 3/202 |
| WO | 2011132365 | A1 | 10/2011 | |

* cited by examiner

MASS-SPECTROMETRIC LEAK DETECTOR WITH TURBOMOLECULAR PUMP AND BOOSTER PUMP ON A COMMON SHAFT

CROSS-REFERENCE TO RELATED APPLICATIONS

This application is the United States national phase of International Application No. PCT/EP2017/064434 filed Jun. 13, 2017, and claims priority to German Patent Application No. 10 2016 210 701.1 filed Jun. 15, 2016, the disclosures of which are hereby incorporated in their entirety by reference.

BACKGROUND OF THE INVENTION

Field of the Invention

The invention relates to a mass-spectrometric leak detector with a multi-stage turbomolecular pump and a booster pump.

Description of Related Art

In a mass-spectrometric leak detector the test object or a test chamber surrounding the test object is evacuated using a typically multi-stage turbomolecular pump, and the gas flow is supplied to a mass spectrometer for analysis of the extracted gas. Here, only a part of the total extracted gas is supplied to the mass spectrometer. Such a mass-spectrometric leak detector is described e.g. in DE 197 35 250 A1. Typically, helium is used as the test gas for the leak detection.

It is further known to provide the gas conducting path of such a mass-spectrometric leak detector, connected to the test object or the test chamber, with a booster pump so as to achieve a faster evacuation of the test object or the test chamber, higher sensitivity, as well as faster response times with larger volumes. Such a leak detector is described in US 2006/0280615 A1. The mass spectrometer is connected to a backing pump via a two-stage turbomolecular pump whose pump stages are arranged on a common shaft. A booster pump is provided in the gas conducting path adapted to be connected to the test object. Here, the suction side of the booster pump is connected to the test object, while the pressure side of the booster pump is connected to an intermediate gas inlet between the two pump stages of the turbomolecular pump and, further, to the gas conducting path between the turbomolecular pump and the backing pump. Each of these gas conducting paths has a valve of its own.

In such conventional mass-spectrometric leak detectors with a booster pump, it is of particular importance that the booster pump has its own drive which typically is arranged on the pressure side of the booster pump. Thus, the drive of the booster pump is connected to the mass spectrometer and to the measuring path for the gas analysis via the intermediate gas inlet of the multi-stage turbomolecular pump. The drive of the booster pump may thereby contaminate the measuring path and affect the analysis performed by the mass spectrometer. Helium, for example, can accumulate in the drive of the booster pump, which gets into the mass spectrometer via the measuring path, where it compromises the measuring result.

Further, mass-spectrometric leak detection arrangements are known, e.g. from EP 0 344 345 A1, in which a plurality of pump stages are arranged on a common shaft. The drive of the pump stages is arranged on the low-pressure end of the shaft and thus on the side of the mass spectrometer. This applies in analogy to the bearings of the shaft. Again, helium accumulated in the pump drive or in the shaft bearing can get into the mass spectrometer via the measuring shaft and thus compromise the measuring result.

SUMMARY OF THE INVENTION

It is an object of the present invention to provide an improved mass-spectrometric leak detector having a multi-stage turbomolecular pump (TMP) and having a booster pump, in which the drive of the TMP, which may be contaminated with helium, is separated from the mass spectrometer as effectively as possible.

The leak detector of the present invention is further described in the non-limiting embodiments below.

According thereto, the pump stages of the turbomolecular pump and the booster pump are arranged on a common shaft and are provided with a common drive. Here, the booster pump is a pump stage of a multi-stage vacuum pump that also comprises the pump stages of the turbomolecular pump. On the suction side, the booster pump stage is provided with a connector for the test object. In the present case, a connector for the test object also means the connector for a test chamber containing the test object. The pressure side of the booster pump stage is connected to the pressure side of the turbomolecular pump and to the suction side of the backing pump via a gas conducting path.

For preventing the drive of the shaft for the pump stages of the turbomolecular pump and the booster pump from contaminating the measuring path to the mass spectrometer, the gas conducting path between the pressure side of the booster pump and the suction side of the pump stage of the turbomolecular pump connected to the mass spectrometer is interrupted by means of a separation. Thereby, accumulations of gas or other contaminations from the drive cannot get into the mass spectrometer.

The separation may be a seal closing the corresponding gas conducting path. Since the gas conducting path leads from the booster pump stage to the mass spectrometer via the shaft, the seal on the shaft has to enable the transmission of the shaft torque. This may be achieved e.g. using a ferrofluidic seal that forms a gas seal through a closed wall through which the torque of the shaft can be transmitted magnetically. A fluid containing ferroparticles is present on both sides of the closed wall. The ferroparticles on the wall side with the driven shaft are caused to rotate by the shaft. The magnetic forces of the rotating ferroparticles act through the closed wall on the ferroparticles in the fluid on the other side of the closed wall and excite the same to rotate, whereby the shaft section on that side of the closed wall is caused to rotate. No gas can get through the closed wall from one side to the other along the shaft.

Another form of the separation can be realized using a separation pump stage, whose suction side is connected to the mass spectrometer and whose pressure side is connected to the pressure sides of the booster pump stage and the pump stage of the turbomolecular pump connected to the mass spectrometer. The separation pump stage is thus arranged on the same shaft as the other pump stages between the booster pump stage and the pump stage connected to the mass spectrometer. The separation pump stage may be designed as a molecular pump stage, e.g. according to the Holweck or Gaede principle, or as a turbomolecular pump stage. In this regard, a molecular pump stage achieves a particularly high compression.

The turbomolecular pump may in particular be of a two-stage design. Together with the booster pump on the same shaft as the two pump stages of the turbomolecular pump, a three-stage vacuum pump is thus formed. In the case of a separation pump stage arranged between the booster pump stage and the turbomolecular pump on the same shaft, a four-stage vacuum pump is formed overall, each of the pump stages being driven by the same drive and by the same shaft.

The common pump drive is preferably arranged at the end of the turbomolecular pump situated between the pump stages of the turbomolecular pump and the backing pump, i.e. on the pressure side of the turbomolecular pump.

The pump stage at the pressure-side end of the turbomolecular pump may be a molecular pump stage or a Holweck stage. The turbomolecular pump has at least one turbomolecular pump stage. The booster pump stage is advantageously designed as a turbomolecular pump stage so as to achieve a high suction capacity for helium.

The invention is based on the idea of providing a mass-spectrometric leak detector having a multi-stage turbomolecular pump and a booster pump stage, in which all pump stages are arranged on only one shaft and are driven by only one common drive. The structure of the leak detector is thus more economic and technically simplified. In order to prevent the drive of such a multi-stage pump arrangement from contaminating the mass spectrometer and thus compromising the measuring result, a separation of the gas conducting path is provided between the booster pump stage and the pump stage connected to the mass spectrometer.

BRIEF DESCRIPTION OF THE DRAWINGS

The following is a detailed description of embodiments of the invention with reference to the Figures. In the Figures.

DESCRIPTION OF THE INVENTION

Figure 1:
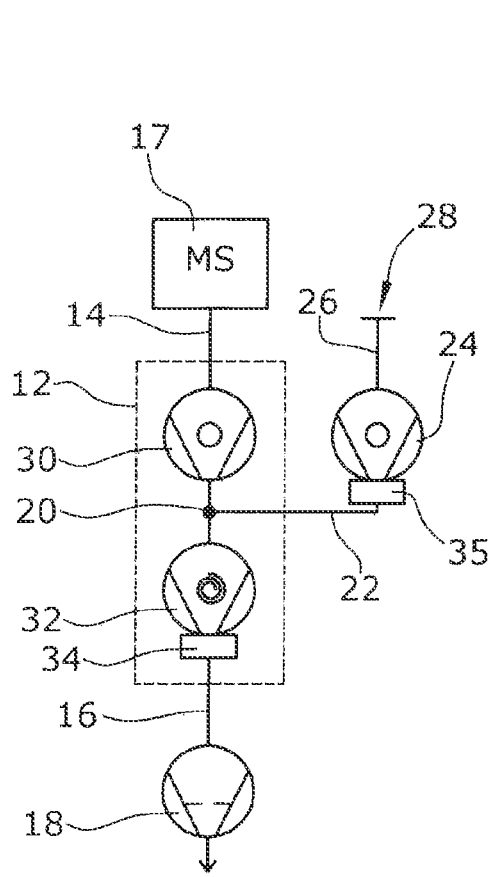
FIG. 1 illustrates a conventional arrangement known from prior art.

FIG. 1 is a schematical illustration of a mass-spectrometric leak detector known from prior art and having a multi-stage turbomolecular pump 12, whose suction side is connected to a mass spectrometer 17 via a gas conducting path 14 and whose pressure side is connected to the suction side of a backing pump 18 via a gas conducting path 16. The turbomolecular pump 12 has an intermediate gas connector 20 which is connected to the pressure side of a booster pump 24 via a further gas conducting path 22. On the suction side, the booster pump 24 which also is a turbomolecular pump is connected, via a gas conducting path 26, to a connector 28 for a test object to be tested or to a test chamber containing the test object. The turbomolecular pump 12 is of a two-stage design with a turbomolecular pump stage 30 and a molecular pump stage 32. The turbomolecular pump stage 30 and the molecular pump stage 32 are seated on a common shaft not illustrated in FIG. 1 and are driven by a common pump drive 34. The pump drive 34 is arranged on the pressure side of the turbomolecular pump 12, i.e. between the pressure side of the molecular pump stage 32 and the suction side of the backing pump 18. The intermediate gas connector 20 connects the pressure side of the booster pump 24 to the pressure side of the turbomolecular pump stage 30 and to the suction side of the molecular pump stage 32. The drive 35 of the booster pump 24 is located directly in the measuring path of the lines 22, 26 coming from the test object 28, whereby accumulated helium from atmospheric air is accumulated in the drive 35 during the pumping process, escapes slowly after low pressure conditions are reached, and thus gets into the mass spectrometer during measuring.

Figure 2:
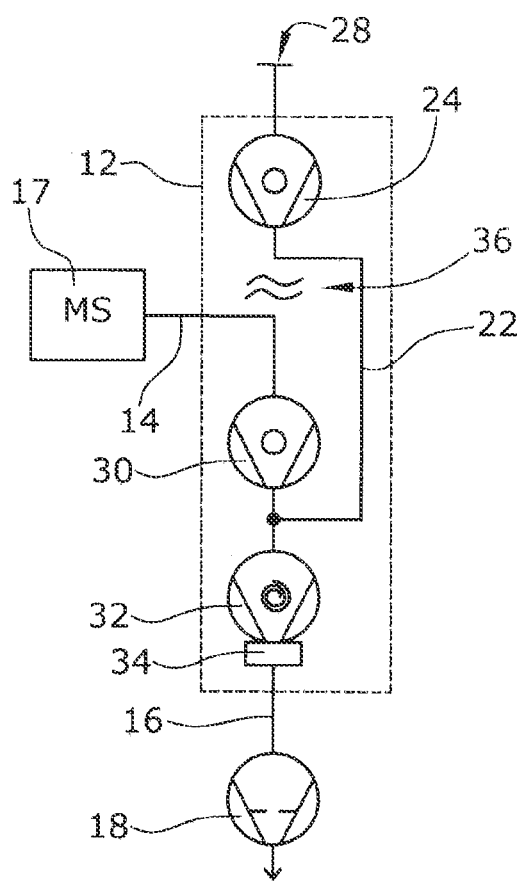
FIG. 2 shows a schematical illustration of an embodiment of the invention.

FIG. 2 shows an embodiment illustrating the basic principle of the invention. It is the basic idea of the invention to design the booster pump 24 as a further pump stage of the turbomolecular pump 12. Here, the booster pump stage 24 is arranged on the same shaft as the turbomolecular pump stage 30 and the molecular pump stage 32 of the turbomolecular pump 12. The booster pump stage 24 is driven by the same and the only pump drive 24 in the pre-vacuum region as the two pump stages 30, 32.

In order to ensure as quick a readiness for measurement as possible, the pressure in the mass spectrometer 17 has to be lower than the pressure in the test object. Since, however, the booster pump 24 compresses the test object pressure towards its outlet side, a separation 36 of the gas conducting path is provided between the suction side of the turbomolecular pump stage 30 and the pressure side of the booster pump stage 24 in order to interrupt the gas conducting path between them. The separation 36 is illustrated as two wave lines in FIG. 2 and can be obtained in various ways.

A first variant not illustrated in the Figures relates to a gas seal surrounding the shaft between the booster pump stage 24 and the turbomolecular pump stage 30, allowing a transmission of torque along the shaft from the drive 34 to the booster pump stage 24. This may be achieved e.g. using a ferrofluidic seal in which, by means of rotating ferroparticles floating in a fluid, the torque is transmitted through a closed wall via magnetic forces.

Figure 3:
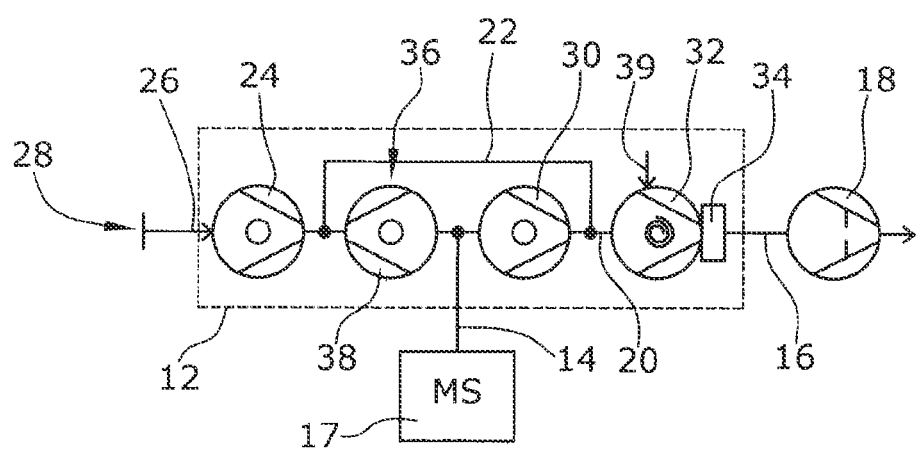
FIG. 3 shows another embodiment of the arrangement in FIG. 2.
Figure 4:
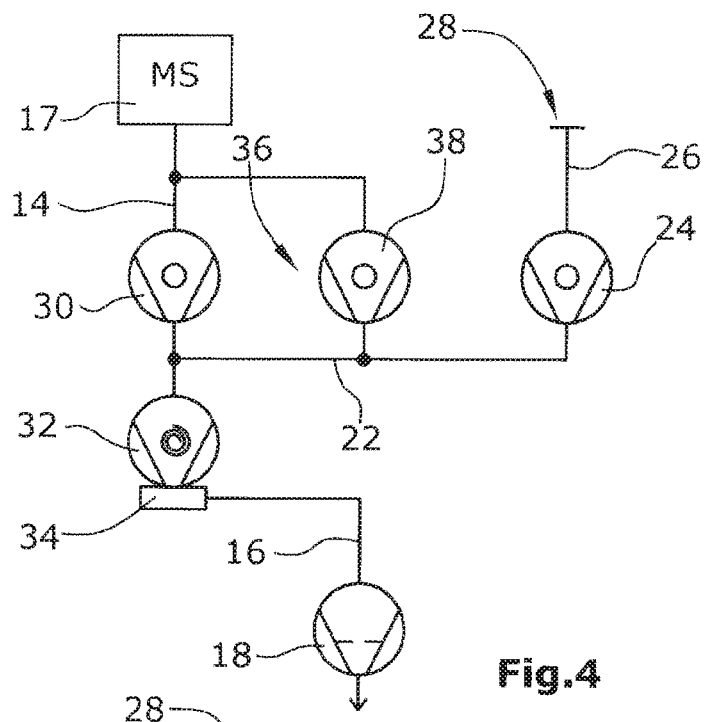
FIG. 4 shows the embodiment of FIG. 3 in schematical illustration similar to FIG. 1.

As an alternative, the separation 36 may also be achieved using the separation pump stage 38 illustrated in FIGS. 3 and 4. Here, the suction side of the separation pump 38 is connected to the gas conducting path 14 which connects the mass spectrometer 17 to the suction side of the turbomolecular pump stage 30. The pressure side of the separation pump stage 38 is connected to the gas conducting path 22 that connects the pressure side of the booster pump stage 24 to the intermediate gas inlet 20 of the turbomolecular pump between the two pump stages 30, 32.

FIG. 4 illustrates the difference, as effected by the invention, between the separation 36 caused by the separation pump stage 38 and the prior art arrangement shown in FIG. 1.

FIG. 3 is an illustration of the embodiment in FIG. 4 corresponding to the arrangement shown in FIG. 2, in which the separation 36 shown in FIG. 2 is effected by the separation pump 38 of FIG. 4. The stage 24 is a pure turbo stage with high suction capacity. The stages 38 and 30 are designed for moderate compression of at least 10 to a maximum of 100 (for water vapor). One of these two stages 38, 30, preferably the stage 38, can alternatively also be designed as a molecular pump stage with a very high compression, since it only forms the separation 36, whereas the other stage 30 is used for the counter current function.

The gas conducting path 22 is a bypass line that connects the outlet of the stage 24 to the inlet of the stage 32. The stage 32 may be designed as a pure screw stage or as a screw stage with one or a plurality of turbo stages at the inlet so as to achieve a separation of the mass spectrometer 17 from the drive 34 that is as effective as possible. An additional connector 39 to the test object 28 may be made into the stage 32, as illustrated in FIG. 3, or also between the stages 30 and 32. This depends on the suction capacity of the stage 32 and on the pressure resistance of the stages 38 and 30.

Figure 5:
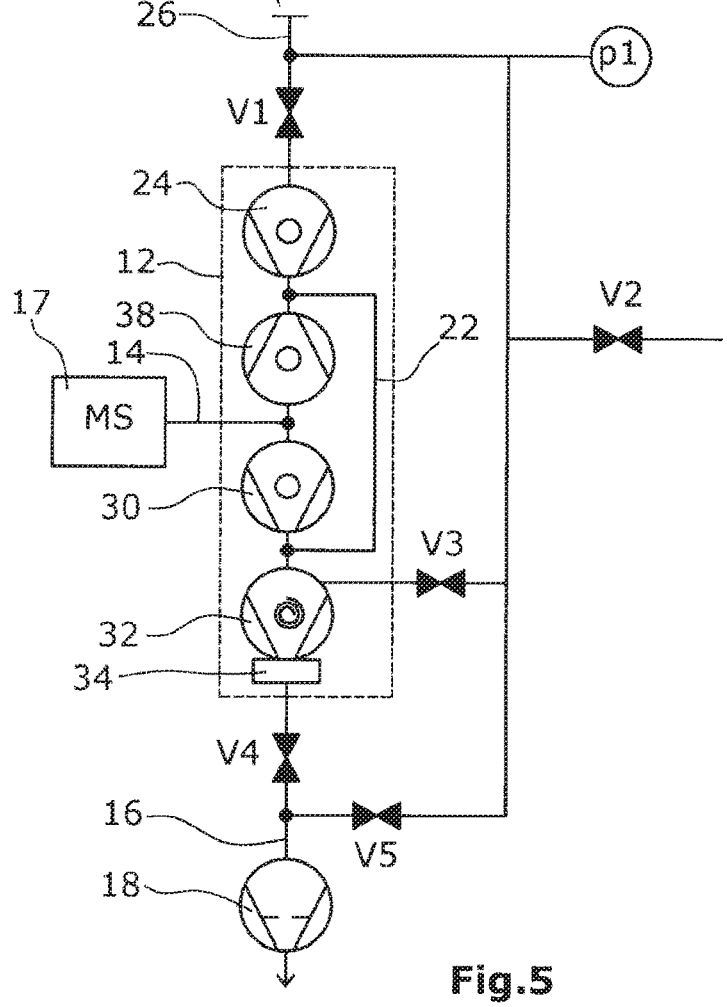
FIG. 5 shows another embodiment with valves for controlling a pumping/measuring cycle.

With respect to the embodiment of FIG. 3, the embodiment of FIG. 5 is supplemented by valves V1-V6 for the operation of the leak detector.

The test object connected to the connector 28 is first evacuated down to about 15 millibar by the backing pump 18 via the valve V5. Thereafter, the valve V4 is opened for the detection of large leaks, and leak detection can begin. The atoms of the test gas reach the mass spectrometer 17 against the compression of the stages 32, 38 and 30, where they are detected. From a pressure $p_2$ of less than 2 mbar, a switching to a more sensitive inlet is effected via the valve V3, which inlet leads into stage 32. The valve V3 is provided in an intermediate inlet of pump stage 32. As an alternative or in addition, the pump stages 32, 38 may be provided with further intermediate connectors so as to bypass parts of the respective pump stages when the pressure conditions are suitable, and to thereby increase sensitivity.

If the pressure falls below a pressure $p_1$ of 0.1 mbar, a switching to the most sensitive operational mode is effected via valve V1, with valve V5 being closed. Now, the high suction capacity of the booster pump 24 acts on the inlet 28 and thus has a positive effect on the signal response time, while the compression of the stage 24 leads to a pressure piling of the helium partial pressure at the connection line 22 and thus to a rise of the signal in the mass spectrometer 17. Now, the suction capacity of the stage 32 and the compression of the stages 38, 30 are decisive for the detection limit of the leak detector.

The invention claimed is:

1. A mass-spectrometric leak detector comprising:
a multi-stage turbomolecular pump having a first pump stage and a second pump stage;
a mass spectrometer connected to a suction side of the multi-stage turbomolecular pump, wherein said first pump stage is connected to said mass spectrometer;
a backing pump connected to a pressure side of the multi-stage turbomolecular pump; and
a booster pump stage whose suction side has a connector for a test object to be tested and whose pressure side is connected to the pressure side of the first pump stage via a first gas conducting path connected to an intermediate gas connector of the turbomolecular pump, and to a suction side of the second pump stage connected to the backing pump;
wherein
pump stages of the multi-stage turbomolecular pump and the booster pump stage are arranged on a common shaft and have a common drive, and
a separation interrupts a second gas conducting path between the pressure side of the booster pump stage and a suction side of a first pump stage of the multi-stage turbomolecular pump connected to the mass spectrometer, wherein said separation prevents a gas flow from the pressure side of the booster pump stage to the suction side of the first pump stage connected to the mass spectrometer.

2. The leak detector of claim 1, wherein the multi-stage turbomolecular pump is of a two-stage design.

3. The leak detector of claim 1, wherein the common drive is arranged at an end of the multi-stage turbomolecular pump situated between the first and second pump stages of the multi-stage turbomolecular pump and the backing pump.

4. The leak detector of claim 1, wherein one of the pump stages of the multi-stage turbomolecular pump is a molecular pump stage and the multi-stage turbomolecular pump comprises at least one turbomolecular pump stage.

5. The leak detector of claim 1, wherein the booster pump stage is a turbomolecular pump stage.

6. The leak detector of claim 1, wherein the separation is a seal closing the second gas conducting path along the common shaft, and torque of the common shaft is transmissible through the seal.

7. The leak detector of claim 6, wherein the seal is formed by a ferrofluidic seal.

8. The leak detector of claim 1, wherein the separation is formed by a separation pump stage whose suction side is connected to the mass spectrometer and whose pressure side is connected to pressure sides of the booster pump stage and of a pump stage of the multi-stage turbomolecular pump connected to the mass spectrometer.

9. The leak detector of claim 8, wherein the separation pump stage is a molecular pump stage.

10. The leak detector of claim 8, wherein the separation pump stage is a turbomolecular pump stage.

* * * * *